United States Patent
Jung et al.

(10) Patent No.: US 7,072,010 B2
(45) Date of Patent: Jul. 4, 2006

(54) MANUFACTURING METHOD OF EMBOSSING PATTERN AND REFLECTIVE LIQUID CRYSTAL DISPLAY DEVICE INCLUDING THE SAME

(75) Inventors: Tae-Yong Jung, Dae-gu (KR); Woong-Sik Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 78 days.

(21) Appl. No.: 10/878,127

(22) Filed: Jun. 29, 2004

(65) Prior Publication Data

US 2005/0052596 A1    Mar. 10, 2005

(30) Foreign Application Priority Data

Sep. 9, 2003    (KR) ............... 10-2003-0062979

(51) Int. Cl.
*G02F 1/1333* (2006.01)
(52) U.S. Cl. .................................... 349/113
(58) Field of Classification Search ............ 349/113, 349/114
See application file for complete search history.

*Primary Examiner*—James A. Dudek
(74) *Attorney, Agent, or Firm*—Birch, Stewart, Kolasch & Birch, LLP (57) ABSTRACT

A method of forming embossing patterns includes forming a metal layer over a substrate, irradiating a laser beam on the metal layer by using a laser apparatus including an optical scanner, and patterning the metal layer by controlling a scan speed of the optical scanner, thereby forming embossing patterns. The inventive embossing patterns can be formed without using a photoresist patterning step.

17 Claims, 8 Drawing Sheets

FIG. 1

RELATED ART

FIG. 2

RELATED ART

FIG. 3A

RELATED ART

FIG. 3B

RELATED ART

FIG. 3C

RELATED ART

FIG. 3D

RELATED ART

FIG. 3E

RELATED ART

FIG. 3F

RELATED ART

MANUFACTURING METHOD OF EMBOSSING PATTERN AND REFLECTIVE LIQUID CRYSTAL DISPLAY DEVICE INCLUDING THE SAME

This application claims the benefit of Korean Patent Application No. 2003-062979, filed in Korea on Sep. 9, 2003, which is hereby incorporated by reference for all purposes as if fully set forth herein.

BACKGROUND OF THE INVENTION

1. Field of the Invention

The invention relates to a liquid crystal display (LCD) device and more particularly, to a manufacturing method of embossing patterns and a reflective liquid crystal display device including the same.

2. Discussion of the Related Art liquid crystal display (LCD) devices have been spotlighted as a next generation display device having high value added because of their low power consumption and good portability.

Optical anisotropy and the polarization characteristics of a liquid crystal material constitute the basis for driving a LCD device. In general, an LCD device includes two substrates, which are spaced apart and facing each other, and a liquid crystal layer interposed between the two substrates. Each of the two substrates includes an electrode, and the electrodes of each substrate also face each other. Voltage applied to each electrode induces an electric field between the electrodes. Alignment of the liquid crystal molecules is changed by varying the intensity or direction of the electric field. The LCD device displays a picture by varying transmittance of the light according to the arrangement (or rearrangement) of the liquid crystal molecules.

An active matrix liquid crystal display (AMLCD) device, which includes thin film transistors as a switching device for a plurality of pixels, has found wide used due to its high resolution and fast moving images.

A related art LCD device will be described hereafter in detail with reference to figures.

Figure 1:
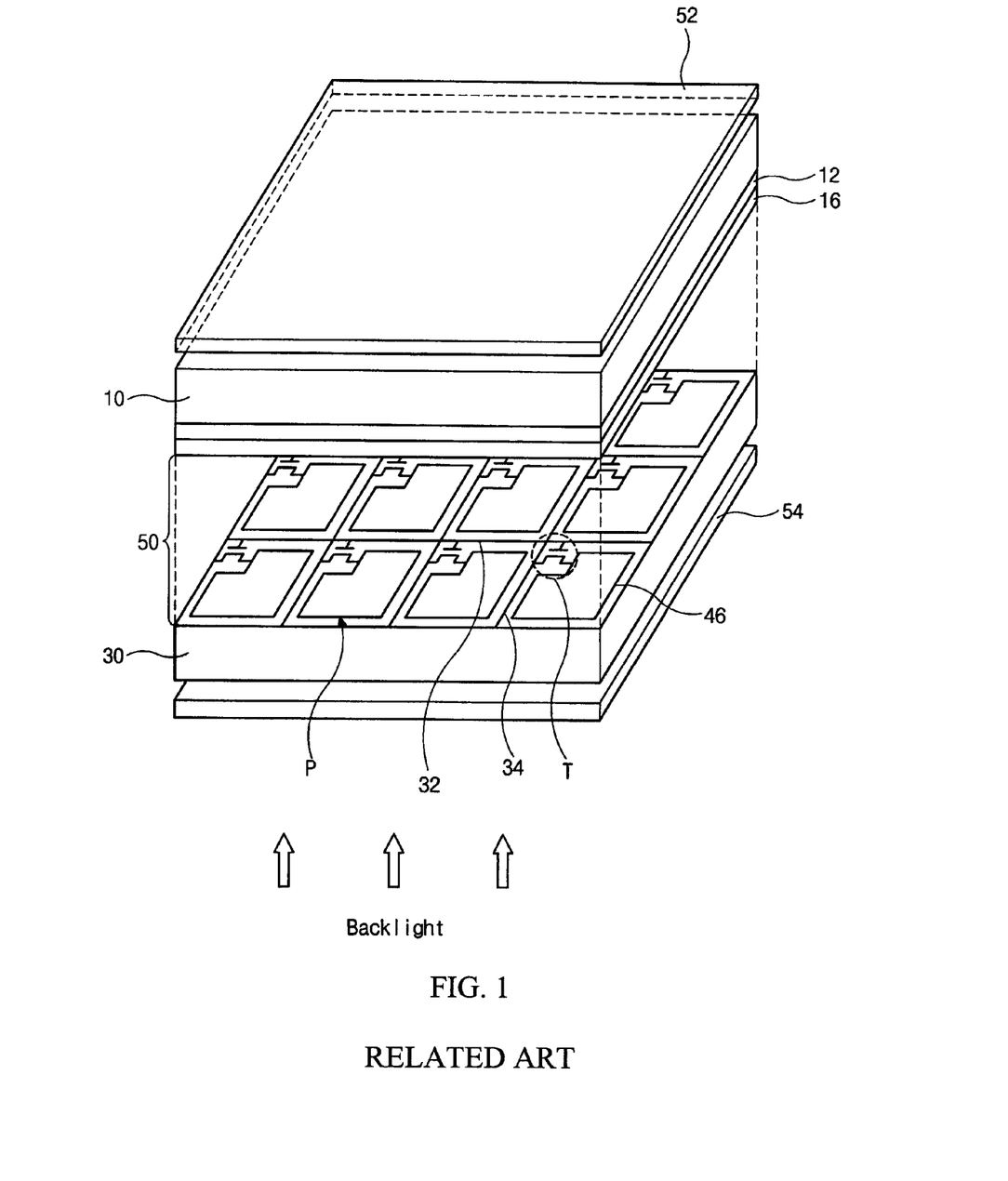
FIG. 1 shows a schematic solid view illustrating a related art LCD device.

FIG. 1 shows a schematic solid view illustrating a related art LCD device. In this LCD device, upper and lower substrates 10 and 30 are spaced apart from and facing each other, and a liquid crystal layer 50 is interposed between the upper substrate 10 and the lower substrate 30.

At least one gate line 32 and at least one data line 34 are formed over the inner surface of the lower substrate 30 (i.e., the side facing the upper substrate 10). The gate line 32 and the data line 34 cross each other to define a pixel region P. A thin film transistor T serves as a switching element, and is formed at the crossing of the gate line 32 and the data line 34. Although not shown in detail in FIG. 1, the thin film transistor T includes a gate electrode, a source electrode, a drain electrode, and an active layer. An array of such thin film transistors T is arranged in a matrix form corresponding to crossings of gate and data lines. A pixel electrode 46, which is connected to the thin film transistor T, is formed in the pixel region P.

The upper substrate 10 includes a color filter layer 12 and a common electrode 16 respectively formed on the inside (i.e., the side facing the lower substrate 30). Although not shown in detail in the figure, the color filter layer 12 includes three sub-color filters of red (R), green (G), and blue (B) transmitting light in a specific wavelength range, and a black matrix blocks light in an area where liquid crystal molecules are not controlled. The black matrix is disposed between the sub-color filters. Each sub-color filter of the color filter layer 12 corresponds to the pixel electrode 46 at the pixel region P.

Upper and lower polarizers 52 and 54, each of which may be a linear polarizer that transmits only linearly polarized light parallel to its light transmission axis, are arranged over outer surfaces of the upper and lower substrates 10 and 30, respectively. Additionally, a backlight disposed over the outer surface of the lower polarizer 54 functions as a light source.

Generally, during a selecting period when a gate signal having an ON state is applied to the gate line 32, voltage applied to the gate electrode (which is connected to the gate line 32) is higher than voltage of the data line 34. Thus, the resistance of a channel between the source and drain electrodes is lowered. Accordingly, the pixel electrode 46 applies the voltage of the data line 34 to the liquid crystal layer 50.

During a non-selecting period, voltage applied to the gate electrode connected to the gate line 32 is lower than voltage of the data line 34. Therefore, the source and drain electrodes are electrically cut, and charges accumulated in the liquid crystal layer 50 are preserved.

In general, a transmissive LCD device utilizes a backlight as an additional light source. However, the backlight of the transmissive LCD device consumes over ⅔ of the total power of the LCD device. Recent developments include a reflective or transflective LCD device, which uses an ambient outer light to reduce the consumption of power or battery drain. A reflective LCD device does not include a backlight.

A reflector having embossing patterns may be used in the reflective or transflective LCD device to increase the amount of light reflected toward a front side by changing local reflective angles.

Figure 2:
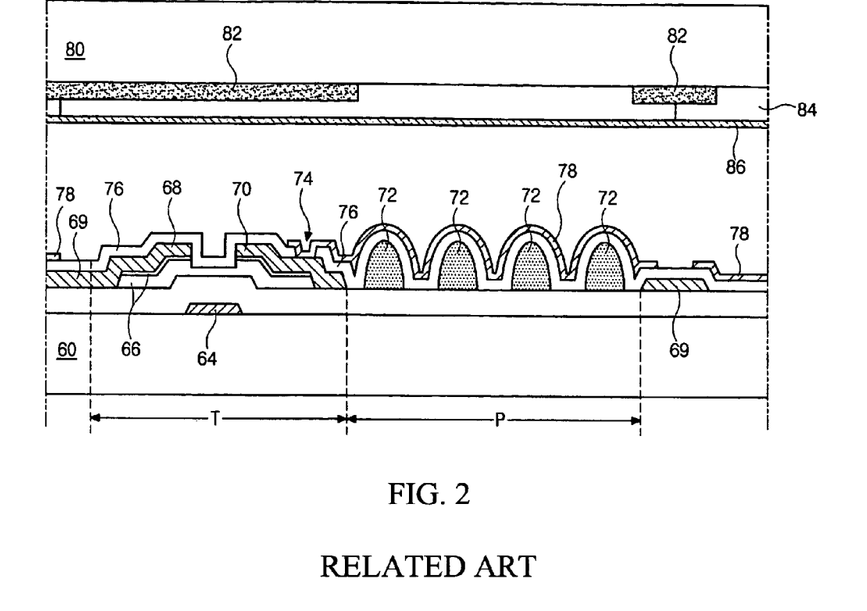
FIG. 2 shows a related art cross-sectional view of a reflective LCD device including embossing patterns.

FIG. 2 illustrates a cross-sectional view of a related art reflective LCD device including embossing patterns. In FIG. 2, a thin film transistor T is formed on a first substrate 60, where a pixel region P is defined as a minimum unit for displaying images. The thin film transistor T includes a gate electrode 64, a semiconductor layer 66, a source electrode 68 and a drain electrode 70. Embossing patterns 72 are formed in the pixel region P on the first substrate 60 including the thin film transistor T. The embossing patterns 72 are spaced apart from each other. The embossing patterns 72 serve as a kind of seed. A passivation layer 76 covers the thin film transistor T and the embossing patterns 72. The passivation layer 76 includes a drain contact hole 74 that exposes a part of the drain electrode 70. The passivation layer 76 has a thickness such that a surface of the passivation layer 76 also has an embossing structure due to the embossing patterns 72.

A reflective electrode 78 is formed on the passivation layer 76 and connects to the drain electrode 70 through the drain contact hole 74. The reflective electrode 78 has a surface of an embossing structure caused by the embossing patterns 72 and the passivation layer 76. The reflective electrode 78 acts as a pixel electrode.

A second substrate 80 is spaced apart from and faces into the first substrate 60. A black matrix 82 is formed on an inner surface of the second substrate 80. The black matrix 82 corresponds to the thin film transistor T and a data line 69, which is connected to the source electrode 68. A color filter layer 84 is formed on the black matrix 82, and a common electrode 86 is formed on the color filter layer 84.

FIGS. 3A to 3F illustrate a manufacturing process of related art embossing patterns.

Figure 3A:
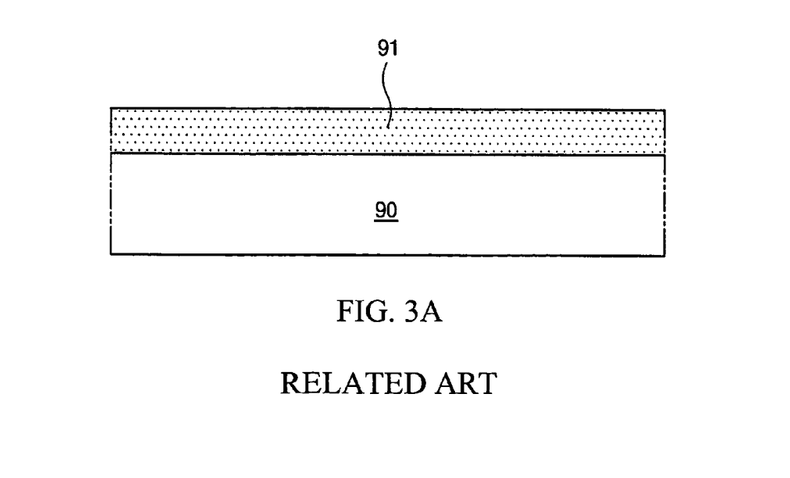
FIGS. 3A to 3F show views illustrating a related art manufacturing process.

In FIG. 3A, coating a photosensitive organic material forms a first insulating layer 91 on a substrate 90. For example, an acrylic-based photoresist may be used as the photosensitive organic material.

Figure 3B:
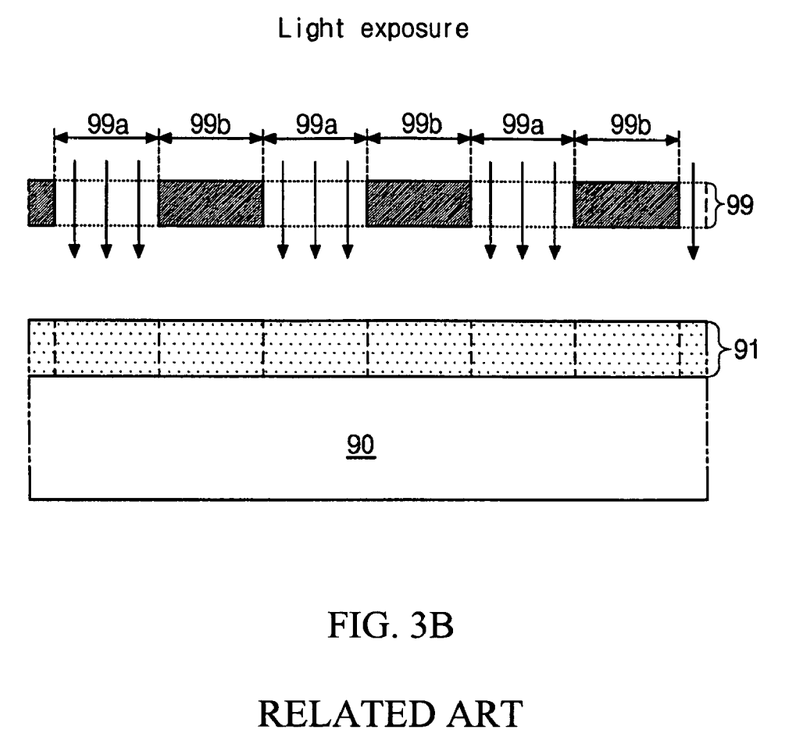

FIG. 3B shows the first insulating layer 91 being selectively exposed to light using a mask 99, which includes opening portions 99a and blocking portions 99b. Here, the photosensitive organic material may be a positive type, in which a portion that has been exposed to light is removed.

Figure 3C:
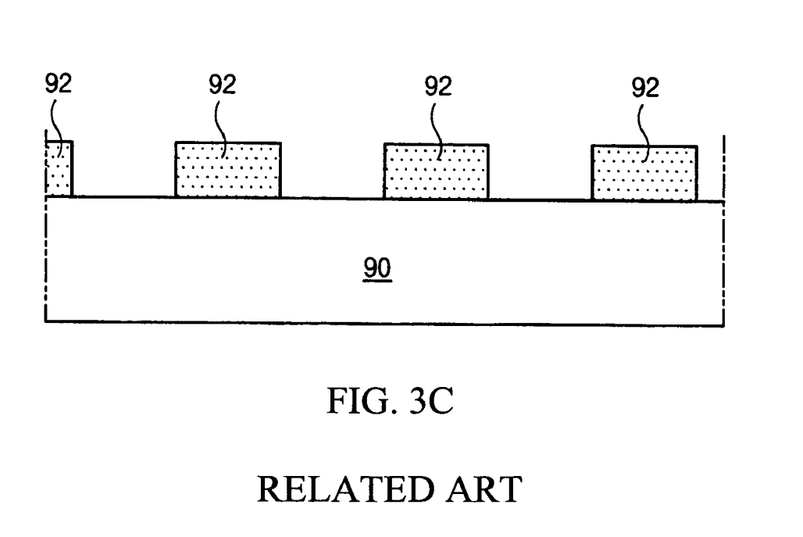

FIG. 3C shows convex patterns 92 being formed by developing the exposed first insulating layer 91 of FIG. 3B using a developer.

Figure 3D:
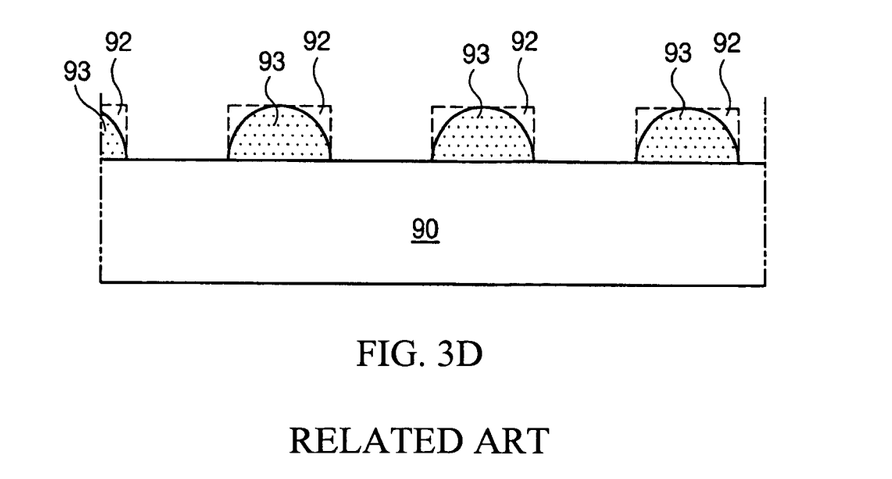

FIG. 3D shows embossing patterns 93 that are formed by repeatedly melting and baking the convex patterns 92. The embossing patterns 93 function as a seed of a micro reflector.

Figure 3E:
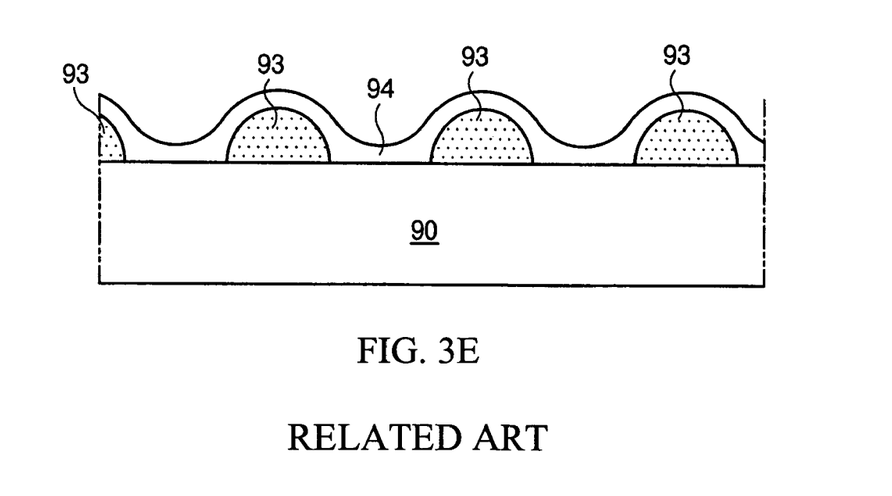

FIG. 3E shows a second insulating layer 94 covering the embossing patterns 93 that is coated on the substrate 90 in order to widen angles of reflection at the embossing patterns 93 by controlling inclined angles of the embossing patterns 93. The second insulating layer 94 may be selected from the same material as the first insulating layer 91, for example, acrylic-based photoresist. The second insulating layer 94 has sufficient thickness to ensure that a surface of the second insulating layer 94 has an embossing structure due to the embossing patterns 93.

Figure 3F:
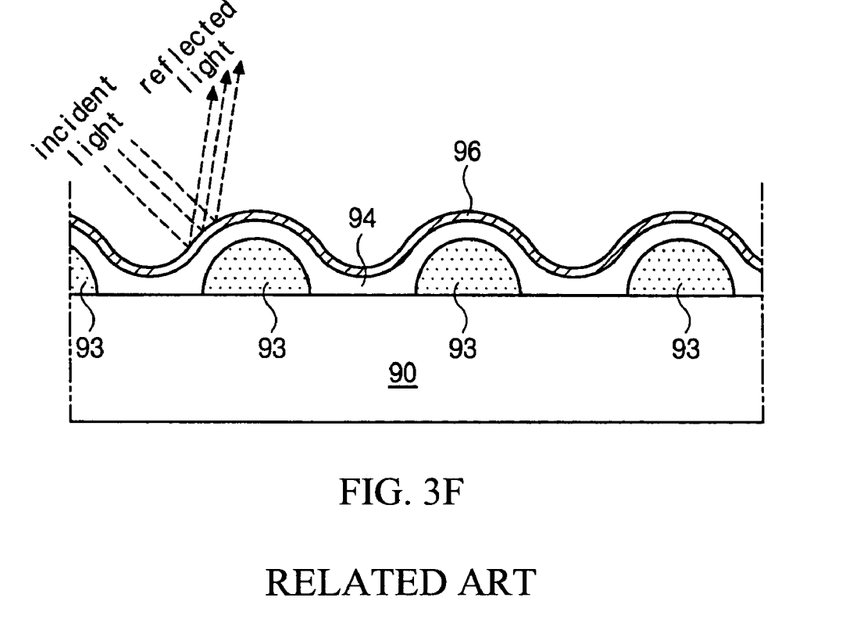

FIG. 3F shows a reflecting layer 96 that is formed on the second insulating layer 94, and the reflecting layer 96 forms by using a metal material that reflects light well. The reflecting layer 96 also has an embossing structure. The metal material for the reflecting layer 96 may be selected from aluminum (Al), silver (Ag), and so on.

Incident light from the outside is reflected toward the front viewing side by the reflecting layer of the embossing structure.

However, manufacturing the reflecting layer having the embossing structure requires a photolithographic process that includes steps for exposing and developing the first insulating layer. In addition, the second passivation layer is also formed. Therefore, the manufacturing process is complicated, and the manufacturing time lengthens and is accompanied by lower processing efficiencies.

SUMMARY OF THE INVENTION

Accordingly, the invention is directed to a manufacturing method of embossing patterns and a reflective liquid crystal display device including the same that substantially obviates one or more problems due to limitations and disadvantages of the related art.

An object of the invention is to provide a manufacturing method of embossing patterns for a reflective liquid crystal display device that reduces process steps and increases reflection efficiencies.

The invention, in part, pertains to a method of forming embossing patterns that includes forming a metal layer on a substrate, irradiating a laser beam on the metal layer by using a laser apparatus including an optical scanner, and patterning the metal layer by controlling a scan speed of the optical scanner, thereby forming embossing patterns. The optical scanner can be a galvo system scanner comprising a mirror, a lens and a driving axis. The embossing patterns can be formed by varying a depth of focus by moving the driving axis. The driving axis can be moved up, down, left and right. The laser beam can have a wavelength within a range of about 0.266 μm to 10.6 μm, and the embossing patterns can have a uniform thickness and have one body. The substrate can be arranged parallel to the optical scanner so that each embossing pattern is substantially completely symmetrical. Also, the substrate is arranged to have an inclined angle with respect to the optical scanner so that each embossing pattern is asymmetrical. The embossing patterns can be formed by a depth of focus of the laser beam, and the embossing patterns are formed without using a photoresist.

The invention, in part, pertains to a liquid crystal display device that includes a first substrate and a second substrate spaced apart from and facing into each other, a pixel electrode on an inner surface of the first substrate and including the embossing patterns formed by steps of forming embossing patterns includes forming a metal layer on a substrate, irradiating a laser beam on the metal layer by using a laser apparatus including an optical scanner, and patterning the metal layer by controlling a scan speed of the optical scanner, thereby forming embossing patterns, a common electrode on an inner surface of the second substrate, and a liquid crystal layer interposed between the first and second substrates.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to embodiments of the invention, which are illustrated in the accompanying drawings.

Figure 4A:
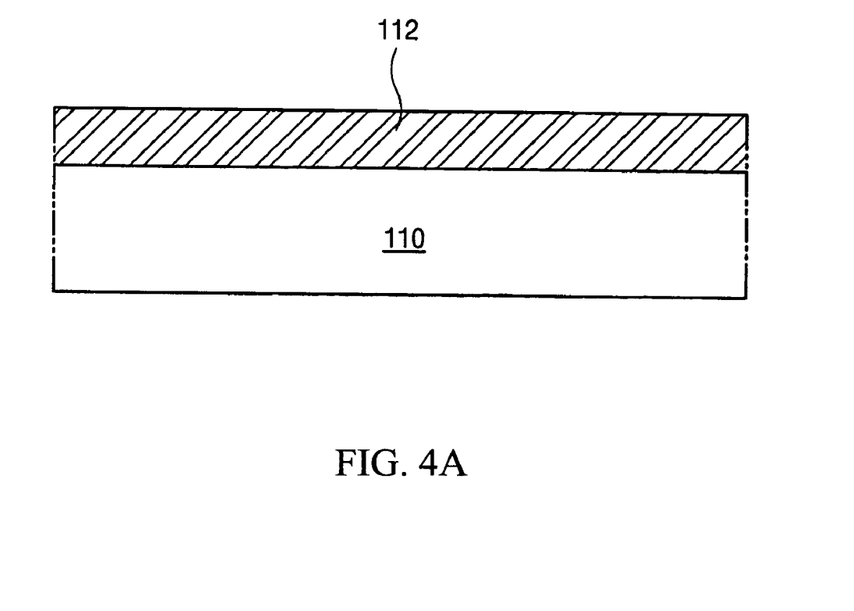
FIGS. 4A to 4C show views illustrating a method of manufacturing a reflector having embossing patterns according to a first embodiment of the invention.
Figure 4B:
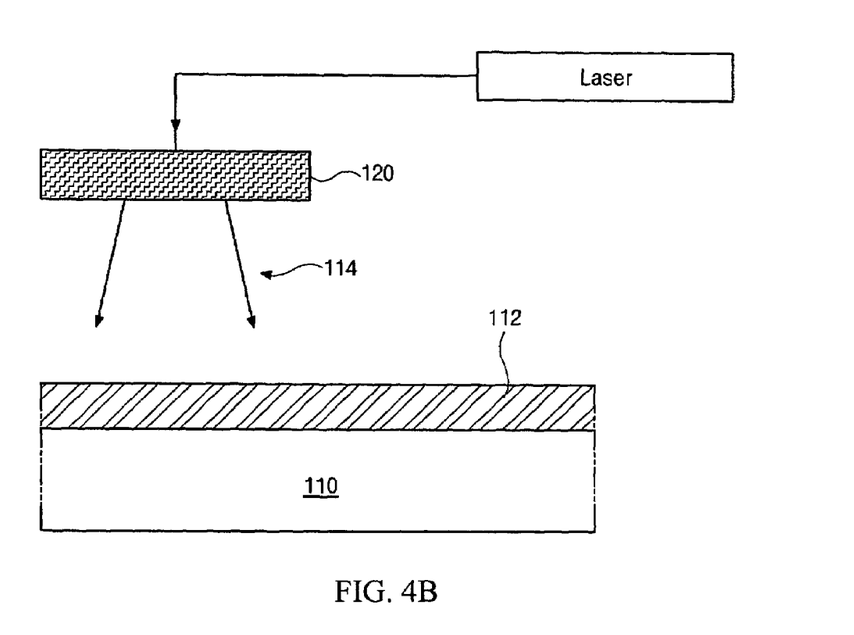
Figure 4C:
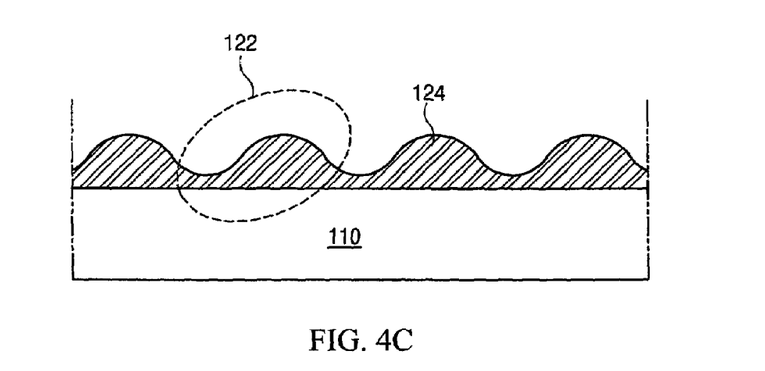

FIGS. 4A to 4C illustrate a method of manufacturing a reflector having embossing patterns according to a first embodiment of the invention.

In FIG. 4A, a metal layer 112 is formed on a substrate 110 by using a metal material that reflects light well. The metal material may be aluminum (Al), aluminum alloys, for example, aluminum-neodymium (AlNd), silver (Ag) or silver alloys.

In FIG. 4B, a laser beam 114 irradiates a surface of the metal layer 112.

A metal material generally has different absorption rates for energy in different specific wavelength ranges. Therefore, in this embodiment, embossing patterns are formed by maximizing the absorption rate for the energy in specific wavelength ranges appropriate to the corresponding metal materials.

For example, a carbon dioxide ($CO_2$) laser beam having a wavelength of about 10.6 µm is used in laser cutting or metal processing. An Nd-YAG (Neodymium-Yttrium Aluminum Garnet) layer, which has a wavelength of about 0.266 µm (266 nm), also etches a surface of the metal material depending on the depth of focus. The depth of focus means a distance from the nearest subject to the farthest subject in complete focus when an image is formed on a film.

The efficiency of energy varies according to the thickness of the metal material. Since the thickness of the metal material is very thin when compared to that used in other industrial fields, most lasers may be used. The efficiency may therefore be influenced by output power of the laser rather than the thickness of the metal material.

The laser beam 114 of this embodiment may preferably have a wavelength within a range of about 0.266 µm to about 10.6 µm.

In the step illustrated in FIG. 4B, a galvo system scanner 120 is used for irradiating the laser beam 114.

The galvo system scanner 120 is a kind of optical scanner that irradiates the laser beam 114 on an entire surface of the substrate 110 by controlling the scan speed of the galvo system scanner 120, thereby forming embossing patterns at the surface of the metal layer 112. Moreover, a driving axis of the galvo system scanner 120 moves toward the X, Y and Z directions, and irregularities of the embossing patterns can be formed by varying the depth of focus.

Although not shown in FIG. 4B, the galvo system scanner 120 includes a mirror, a lens and the driving axis for driving an optical system.

In FIG. 4C, the irradiation of the laser beam 114 of FIG. 4B forms a reflector 124 having embossing patterns 122. Here, the galvo system scanner 120 of FIG. 4B is disposed parallel to the substrate 110, and each embossing pattern 122 is thus substantially completely symmetrical with respect to a normal direction to the substrate 110.

The embossing patterns may have an asymmetric structure by arranging the galvo system scanner and the substrate at an inclined angle.

Figure 5A:
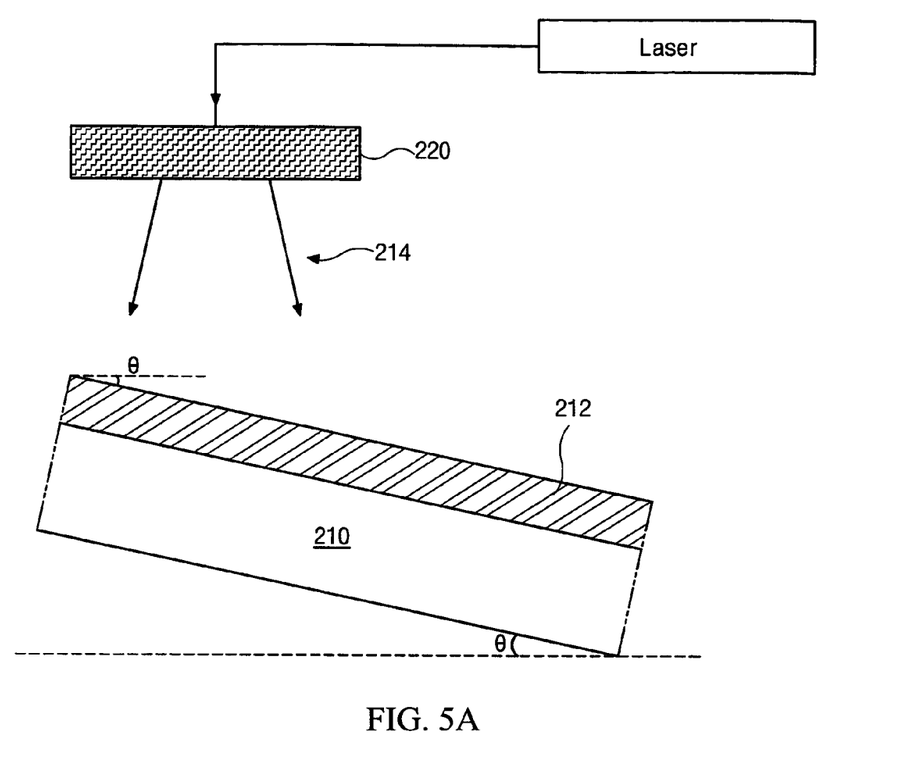
FIGS. 5A and 5B show views illustrating a method of manufacturing a reflector having embossing patterns according to a second embodiment of the invention.
Figure 5B:
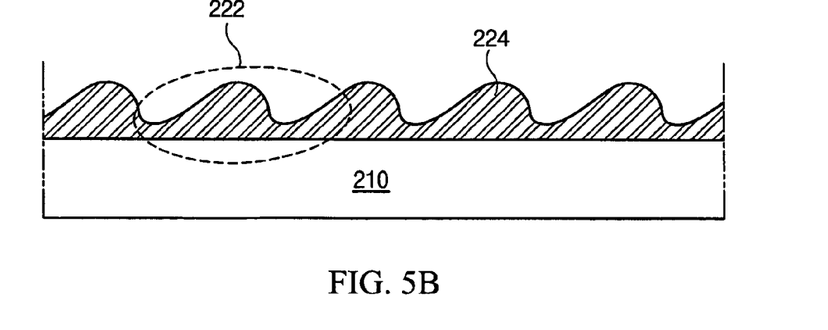

FIGS. 5A and 5B illustrate a method of manufacturing a reflector having embossing patterns according to a second embodiment of the invention.

In FIG. 5A, a laser beam 214 irradiates a substrate 210, where a metal layer 212 is formed from a metal material that reflects light well.

Here, a galvo system scanner 220 is used similarly to the first embodiment, and the galvo system scanner 220 and the substrate 210 are arranged with an inclination angle within a certain angle range. For example, the substrate 210 is disposed to have an inclination angle of θ with respect to the galvo system scanner 220.

Accordingly, FIG. 5B shows a reflector 224 having asymmetric embossing patterns 222 being formed by the irradiation of the laser beam 214 of FIG. 5B. The asymmetric embossing patterns 222 are formed using energy difference due to the depth of focus of the laser beam 214, which is irradiated to the substrate 210 through the galvo system scanner 220. The asymmetric embossing patterns 222 broaden reflection ranges as compared with the symmetric embossing patterns of the first embodiment.

The embossing patterns of the first and second embodiments have a uniform thickness and are formed with one body. That is, the first and second embodiments pertain to a unified embossing pattern.

Figure 6:
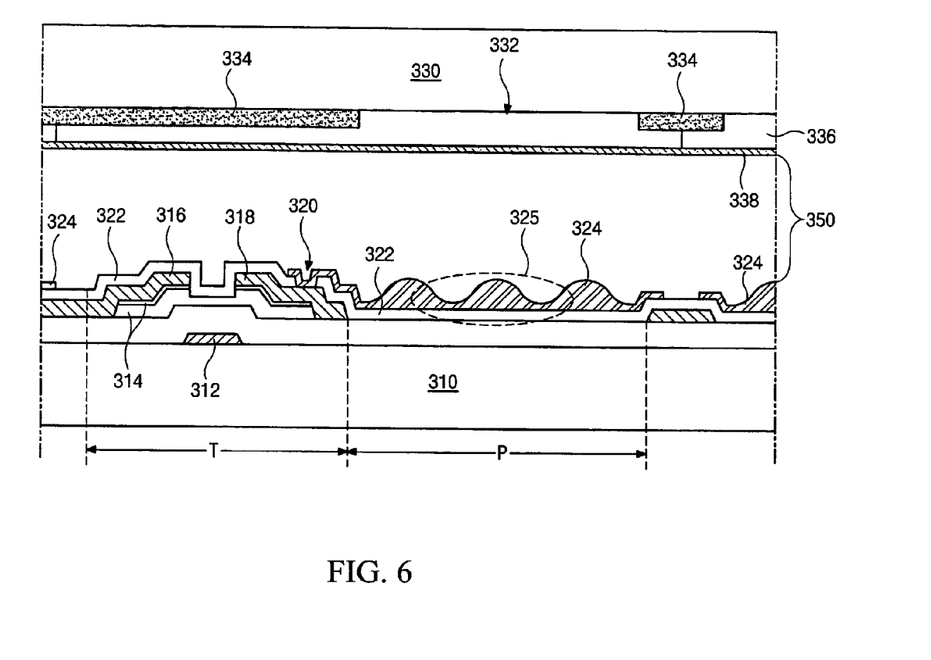
FIG. 6 shows a cross-sectional view of a reflective LCD device according to the invention.

FIG. 6 illustrates a reflective LCD device according to an embodiment of the invention. FIG. 6 shows a first substrate 310 and a second substrate 330 that are spaced apart from and facing each other. A thin film transistor T, which includes a gate electrode 312, a semiconductor 314, a source electrode 316 and a drain electrode 318, is formed over an inner surface of the first substrate 310. A passivation layer 322 covers the thin film transistor T, and has a drain contact hole 320 exposing a part of the drain electrode 318. A reflective electrode 324 is formed over the passivation layer 322 and is connected to the drain electrode 318 through the drain contact hole 320.

The reflective electrode 324 includes embossing patterns 325 that are formed by a laser without using a photoresist material. That is, the inventive technology of changing the depth of focus produces an embossing pattern without a step of photoresist patterning. The embossing patterns 325 may be symmetric ones of the first embodiment or asymmetric ones of the second embodiment. The reflective electrode 324 acts as a pixel electrode.

Meanwhile, a black matrix 334 is formed over an inner surface of the second substrate 330. The black matrix 334 has an opening 332 corresponding to a pixel region P. A color filter layer 336 is formed over the black matrix 334, and includes three sub-color filters of red (R), green (G), and blue (B). The black matrix 334 is disposed in a border between the sub-color filters, and each sub-color filter of the color filter layer 336 corresponds to the opening 332. A common electrode 338 is formed over the color filter layer 336.

A liquid crystal layer 350 is interposed between the reflective electrode 324 and the common electrode 338. The liquid crystal can be based on a material having either a positive dielectric anisotropy or a negative dielectric anisotropy. Surface treatments of the reflective electrode 324 and the common electrode 338 may be used to align the liquid crystal material.

The reflector according to the first or second embodiment may be used as a reflector for a transflective LCD device having a reflective mode and a transmissive mode.

Since the embossing patterns are formed by irradiation of the laser beam, the number of manufacturing processes is reduced. Additionally, the ease of formation of the symmetric embossing patterns or asymmetric embossing patterns (by controlling the inclined angle between the laser and the substrate) results in increasing the reflection efficiencies.

It will be apparent to those skilled in the art that various modifications and variations can be made in the fabrication and application of the invention without departing from the spirit or scope of the invention. Thus, it is intended that the invention cover the modifications and variations of this invention provided they come within the scope of the appended claims and their equivalents.

What is claimed is:

1. A method of forming embossing patterns, comprising:
   forming a metal layer over a substrate;
   irradiating a laser beam at the metal layer by using a laser apparatus including an optical scanner; and
   patterning the metal layer by controlling a scan speed of the optical scanner, thereby forming embossing patterns.

2. The method according to claim 1, wherein the optical scanner is a galvo system scanner comprising a mirror, a lens and a driving axis.

3. The method according to claim 2, wherein the embossing patterns are formed by varying a depth of focus by moving the driving axis.

4. The method according to claim 3, wherein the driving axis is moved up, down, left and right.

5. The method according to claim 1, wherein the laser beam has a wavelength within a range of 0.266 µm to 10.6 µm.

6. The method according to claim 1, wherein the embossing patterns have a uniform thickness.

7. The method according to claim 1, wherein the embossing patterns have one body.

8. The method according to claim 1, wherein the substrate is arranged parallel to the optical scanner.

9. The method according to claim 6, wherein each embossing pattern is substantially completely symmetrical.

10. The method according to claim 1, wherein the substrate is arranged to have an inclined angle with respect to the optical scanner.

11. The method according to claim 10, wherein each embossing pattern is asymmetrical.

12. The method according to claim 1, wherein the embossing patterns are formed by a depth of focus of the laser beam.

13. The method according to claim 1, wherein the embossing patterns are formed without using a photoresist.

14. A liquid crystal display device, comprising:
- a first substrate and a second substrate spaced apart from and facing into each other;
- a pixel electrode over an inner surface of the first substrate, a top surface of the pixel electrode having metal embossing patterns, a bottom surface of the pixel electrode being flat;
- a common electrode on an inner surface of the second substrate; and
- a liquid crystal layer interposed between the first and second substrates.

15. The device according to claim 14, wherein the pixel electrode reflects light and the liquid crystal display device is a reflective type.

16. The device according to claim 14, wherein the pixel electrode includes a reflector of the embossing patterns and the liquid crystal device is a transflective type having both a reflective mode and a transmissive mode.

17. The device according to claim 14, further comprising a thin film transistor connected to the pixel electrode.

* * * * *